(12) United States Patent
Aslett et al.

(10) Patent No.: US 12,545,623 B2
(45) Date of Patent: Feb. 10, 2026

(54) CRUCIBLES AND COMPOSITIONS AND PROCESSES FOR MAKING SAME

(71) Applicant: MATERION CORPORATION, Mayfield Heights, OH (US)

(72) Inventors: Zan Aslett, Mayfield Heights, OH (US); Fritz Grensing, Mayfield Heights, OH (US); Evan K. Morey, Mayfield Heights, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 1151 days.

(21) Appl. No.: 17/604,325

(22) PCT Filed: Apr. 16, 2020

(86) PCT No.: PCT/US2020/028415
§ 371 (c)(1),
(2) Date: Oct. 15, 2021

(87) PCT Pub. No.: WO2020/214755
PCT Pub. Date: Oct. 22, 2020

(65) Prior Publication Data
US 2022/0212998 A1  Jul. 7, 2022

Related U.S. Application Data

(60) Provisional application No. 62/835,192, filed on Apr. 17, 2019.

(51) Int. Cl.
| | |
|---|---|
| *C04B 35/117* | (2006.01) |
| *B22D 41/00* | (2006.01) |
| *C04B 35/08* | (2006.01) |
| *C04B 35/505* | (2006.01) |
| *C04B 35/626* | (2006.01) |
| *C04B 35/63* | (2006.01) |
| *C04B 35/632* | (2006.01) |
| *C04B 35/64* | (2006.01) |
| *F27B 14/10* | (2006.01) |
| *F27D 1/00* | (2006.01) |

(52) U.S. Cl.
CPC ............ *C04B 35/117* (2013.01); *B22D 41/00* (2013.01); *C04B 35/08* (2013.01); *C04B 35/505* (2013.01); *C04B 35/62655* (2013.01); *C04B 35/62695* (2013.01); *C04B 35/6303* (2013.01); *C04B 35/632* (2013.01); *C04B 35/64* (2013.01); *F27B 14/10* (2013.01); *F27D 1/0006* (2013.01); *C04B 2235/3217* (2013.01); *C04B 2235/386* (2013.01); *C04B 2235/5436* (2013.01); *C04B 2235/9676* (2013.01)

(58) Field of Classification Search
None
See application file for complete search history.

(56) References Cited

U.S. PATENT DOCUMENTS

| | | | |
|---|---|---|---|
| 3,063,865 A | | 11/1962 | Baer et al. |
| 3,367,811 A | | 2/1968 | Baer et al. |
| 5,132,145 A | | 7/1992 | Valentian |
| 5,333,844 A | | 8/1994 | Holcombe et al. |
| 5,667,600 A | | 9/1997 | Grensing et al. |
| 5,744,411 A | | 4/1998 | Zhao et al. |
| 7,118,789 B2 | | 10/2006 | Kemmochi et al. |
| 2002/0037800 A1* | 3/2002 | Yang | ............ C04B 35/64 |
| | | | 501/87 |
| 2010/0093513 A1* | 4/2010 | Nakama | ............ C04B 35/6303 |
| | | | 501/97.3 |
| 2014/0030138 A1* | 1/2014 | Bewlay | ............ C04B 35/6269 |
| | | | 266/200 |

FOREIGN PATENT DOCUMENTS

| | | | | |
|---|---|---|---|---|
| CN | 104311041 A | | 1/2015 | |
| CN | 106866168 A | * | 6/2017 | ........... C04B 35/622 |
| CN | 108727047 A | | 11/2018 | |
| CN | 108794027 A | * | 11/2018 | ............ C04B 35/10 |
| EP | 0193192 B1 | | 11/1989 | |
| WO | 2000044959 A1 | | 8/2000 | |
| WO | 0216677 A1 | | 2/2002 | |

OTHER PUBLICATIONS

Machine Translation of CN-108794027-A (Year: 2018).*
Machine Translation of CN-108794027-A ("Qiu") (Year: 2018).*
Machine Translation of CN-106866168-A ("Liu") (Year: 2017).*
International Application No. PCT/US2020/028415, International Search Report mailed Jun. 23, 2020, 3 pages.

* cited by examiner

*Primary Examiner* — Amber R Orlando
*Assistant Examiner* — Paul Alan Forsyth
(74) *Attorney, Agent, or Firm* — COZEN O'CONNOR

(57) ABSTRACT

A crucible having a heat treated body. The heat treated body comprises a composition including an oxide material, from 5 wt % to 50 wt % a nitride material, and optionally a sintering aid. A weight ratio of the nitride material to the oxide material ranges from 0.02:1 to 2.0:1. The heat treated body has an oxide material lattice structure with nitride material at least partially encapsulated therein.

20 Claims, No Drawings

CRUCIBLES AND COMPOSITIONS AND PROCESSES FOR MAKING SAME

CROSS REFERENCE TO RELATED APPLICATION

The present application claims priority to and filing benefit of U.S. Provisional Patent Application No. 62/835,192, filed on Apr. 17, 2019, which is incorporated herein by reference in its entirety.

FIELD

The present disclosure relates to high temperature containers, e.g., crucibles, to methods for making these containers, and to methods for preventing materials held by the containers from sticking to the surfaces of the containers.

BACKGROUND

High temperature containers, e.g., ceramic crucibles, are generally known for use in many applications including, for example, holding molten metals in deposition operations. These metal depositions are typically conducted under high heat. Unfortunately, conventional crucibles have been found to lack the ability to withstand the high temperatures at which certain metals may be deposited. In some cases, the conventional crucibles exhibit cracking at these temperatures, which results in leaking, contamination, metal loss, and other process-related problems.

Additionally, certain deposition metals, including but not limited to, silver, gold, copper, aluminum, magnesium, titanium, platinum, lead, are known to stick or adhere to the walls of typical crucibles, e.g., when the metals cool down after heating in the deposition process. When the ceramic crucible and the metal stick together and temperature changes, the difference in thermal properties of the two compounds can lead to cracking of the ceramic crucible. Further, because the deposition is typically also conducted under low pressure conditions, outgassing of gasses trapped inside the crucibles may detrimentally occur and the outgassed impurities may be undesirably released from the crucible into the deposition chamber where they can contaminate the metal to be deposited and create other processing problems.

Also, some conventional containers are constructed of carbon (graphite). However, these crucibles are known to contribute carbon-based contamination to the deposition chamber, which is highly undesirable.

Importantly, the cost associated with maintenance of conventional crucibles for metal depositions is significant. This is partly because conventional crucibles cannot withstand heating/cooling cycles, e.g., during operation and/or cleaning. Nor can these crucibles hold up under harsh cleaning operations that utilize strong acids, such as nitric acid. Under these conditions, the conventional crucibles tend to break, which results in leaking, contamination, metal loss, etc. Additionally, some conventional crucibles for metal depositions, e.g., those made from high concentrations of boron nitride, are also relatively small, which can limit the amount of metal contained, which in turn limits production throughput.

As one example of a conventional crucible, U.S. Pat. No. 5,667,600 discloses a practical aluminum-based alloy containing 1 to 99 weight percent beryllium and improved methods for the investment casting of net shape aluminum-beryllium alloy parts.

As another example, U.S. Pat. No. 5,333,844 discloses that a multi-piece crucible for high temperature applications comprises a tubular side wall member having a lip on the inside surface and a bottom member or members forming a container for containing a melt of a material during a high temperature melt-casting operations. The multi-piece design prevents cracking of the crucible or leakage of the melt from the crucible during the melt-casting operation. The lip of the tubular member supports the bottom member. The contacting surfaces where the lip of the tubular side wall member contacts the bottom member of the multi-piece crucible contains a ceramic sealing material. The ceramic sealing material forms a seal sufficient to prevent the melt of the material from leaking out of the multi-piece crucible during the melt-casting process. The multi-piece crucible is made of a material which is chemically inert to the melt and has structural integrity at the melting point temperature of the melt, or of a material coated with such a material.

As yet another example, U.S. Pat. No. 3,063,865 discusses coating and more particularly coating of a substrate by the vapor deposition of aluminum under a high vacuum.

As a further example, European Patent No. EP0193192B1 relates generally to a pyrolytic boron nitride article and a method for producing the same, and more particularly to a pyrolytic boron nitride article adapted for use as a crucible for containing metals, such as epitaxy metals, in the evaporation process, as a boat for containing a material for semiconductor in the semiconductor growing process, as a jig, as a travelling wave tube support rod, as a material for forming a window passing microwave and infrared rays therethrough, and as a material for electric insulators.

And, Chinese Patent Application No. CN104311041 discusses a beryllium oxide crucible for smelting pure beryllium, and a preparation method thereof. The beryllium oxide crucible for smelting the pure beryllium is formed by using calcined beryllium oxide as a main material, 0.1%-0.5% by weight of phosphoric acid and 3%-10% by weight of pure water as auxiliary materials; mixing the above materials uniformly under stirring; tamping and sintering. According to the invention, calcined beryllium oxide is used as a raw material; phosphoric acid and pure water are used as binding agents; and the beryllium oxide crucible for smelting the pure beryllium is prepared by adopting a tamping forming method. The process flow is short; the production method is simple; a preparation period is short; the prepared pure beryllium crucible has good suddenly-changing temperature resistance and can fully guarantee the purity of beryllium ingots.

Even in view of the references, the need exists for an improved high temperature container that demonstrates superior performance and durability over a wide range of temperature, such as from room temperature to 1700° C., that limits or avoids metal sticking and that overcomes many or all of the other shortcomings of the conventional crucibles discussed above.

SUMMARY

In one embodiment, the disclosure relates to a crucible having a heat treated body. The heat treated body comprises a composition including an oxide material, from 5 wt % to 50 wt % a nitride material, e.g., boron nitride, and optionally a sintering aid. The oxide material may be a metal oxide, e.g., aluminum oxide, beryllium oxide, or (less than 10 wt %) yttrium oxide (yttria), or combinations thereof. A weight ratio of the nitride material to the oxide material may range from 0.02:1 to 2.0:1 and/or a weight ratio of the nitride material to sintering aid may range from 2:1 to 100:1. The heat treated body has an oxide material lattice structure with nitride material, e.g., at least 10% thereof, at least partially encapsulated therein, e.g., at least 10% of the nitride material is encapsulated in the oxide material lattice structure. The sintering aid may comprise a rare earth metal, fumed silica, magnesium oxide, petalite, tetraethyl orthosilicate, or magnesium trisilicate, or combinations thereof. In the heat treated body, boron nitride may be at least partially encapsulated such that boron nitride comprises less than 50% of a surface area of an exterior surface of the heat treated body. The encapsulation of the nitride material may be achieved by heat treating a precursor composition to form the heat treated body comprising a heat treated composition comprising (a heat treated or sintered amount of) boron nitride, and the precursor may comprise (an initial amount of) an oxide material, a nitride material, and a sintering aid and the heat treated amount is less than the initial amount. The heat treated body further comprises nitrided aluminum co-product and/or oxided boron co-product, and the oxide material and/to the nitride material are distributed throughout heat treated body. The oxide material and/or the nitride material are not a coating of the heat treated body. When contacted with molten metal at temperatures below 2500° C., less than 5% of the contacted surface area is adhered to by the molten metal and/or when contacted with molten metal at temperatures greater than or about 1550° C. or above, less than 5% of the contacted surface area is adhered to by the molten metal or the wetting angle of the molten metal is greater than 90 degrees. The heat treated body may be non-reactive with the molten metal at the elevated temperature and/or the heat treated body and the molten metal may have different thermal conductivities and/or the heat treated body may be less thermally conductive than a molten metal the crucible is configured to hold for deposition. The heat treated body may define a volume of 1 $cm^3$ to 5000 $cm^3$ for holding a molten metal and/or may have an average wall thickness ranging from 2 mm to 25 mm and/or may have limited reactivity with nitric acid and/or may have density ranging from 65% to 99% of a theoretical density of the precursor composition. After exposure to at least 10 cycles of 68% nitric acid cleaning, the heat treated body may retain at least 99% of the initial hardness. The composition may comprise less than 1 wt % carbon and/or may be substantially uniform.

In one embodiment, the disclosure relates to a process for producing the crucible. The method comprises: providing an oxide material, optionally in a powder form; providing a nitride material, optionally in a powder form, in an amount from 10 wt % to 50 wt %; providing a sintering aid; mixing the oxide material, the nitride material, and the sintering aid to form a precursor composition; wherein a weight ratio of the nitride material to the oxide material in the precursor composition ranges between 0.05:1 and 2.0:1; shaping the precursor composition; and heat treating the shaped composition to form the heat treated body wherein in the heat treated body, the nitride material is at least partially encapsulated in an oxide material lattice structure. The mixing of the oxide material, the nitride material, and the sintering aid may be performed using a mill. The process may further comprise adding a binder to the precursor composition and/or mixing the precursor composition with a binder, and spray drying the precursor composition mixed with the binder into particles or agglomerates. The particles or agglomerates may have an average diameter ranging from 40 microns to 120 microns. The heat treating may comprise cold isostatic pressing the shaped composition to form the heat treated body or hot isostatic pressing the shaped composition to form the heat treated body. The shaped composition may be baked at a temperature at about 400° C. for about 60 minute and/or may be conducted in air and/or nitrogen. The heat treated body may substantially uniform or homogenous, e.g., the components of the heat treated body are dispersed throughout in a substantially uniform or homogenous manner.

DETAILED DESCRIPTION

As discussed above, metal depositions are typically conducted under high heat (and low pressure) conditions. As technology advances, higher deposition temperatures are becoming prevalent. Few, if any, containers, e.g., those made of boron nitride or some metal oxides, however, are able to withstand these higher temperatures. Importantly, with many conventional crucibles, the deposition metals have the tendency to stick or adhere to the walls of the crucibles (stickiness). When the oxide ceramic and the metal stick or adhere to one another and subsequently cool, problems such as the oxide ceramic cracking can occur. Further, conventional crucibles have been found to be unable to withstand multiple heating/cooling cycles and/or cleaning cycles, which detrimentally affects process operations and maintenance. In addition, the friability of conventional crucibles has been found to be unacceptable, especially in higher temperature operations.

As noted above, although nitrides, e.g. boron nitride, have been employed in high temperature container applications, there has been little if any discussion or teaching regarding a combination of nitrides and metal oxides, e.g., alumina or beryllium oxide, for these applications.

As disclosed, a particular container precursor composition that includes a mixture of an oxide material, a nitride material, and an optional sintering aid (at the specific amounts, limits, and ratios described herein) may form containers (crucibles) having synergistic combinations of performance features. In some cases, the precursor compositions are heat treated, e.g., sintered, under particular conditions (described herein), and these conditions provide for or contribute to the synergistic combinations of performance features. Other non-crucible and non-container structures made from the disclosed materials are contemplated, e.g., the disclosure is not limited to crucibles.

Also disclosed is an oxide/nitride composition comprising the an oxide material; from 5 wt % to 50 wt % of the nitride material; an optional a sintering aid. The weight ratio of the nitride material to the oxide material may range from 0.02:1 to 2.0:1. The composition may form an oxide material lattice structure with nitride material at least partially encapsulated therein.

In some embodiments, the oxide material and the nitride material form a matrix, e.g., a lattice structure, wherein the oxide material solidifies around the nitride material, thus encapsulating or surrounding at least a portion of the particles of the nitride material. As such, the oxide lattice supports or holds in place the particles of nitride material. In contrast, many conventional crucibles may employ one or more composition components that are present as a coating on the walls of the respective crucible, which is an entirely different structure that does not exhibit the aforementioned synergistic combinations of performance features. Such coatings may detrimentally cause contamination concerns and/or may be more likely to fail during repeated use either through adhesion failure to the main body or erosion of the relatively thin coatings.

As one example of an advantageous performance feature, the crucibles, containers, and other structures described herein have been found to beneficially limit or prevent the metal, such as silver, gold, copper, aluminum, magnesium, titanium, platinum, lead, etc., from sticking or adhering to the crucible surface (demonstrating non-stickiness). It is postulated that particles of the nitride material may become (at least partially) encapsulated in the oxide material matrix, and that this encapsulated nitride material, especially the particles at or near the surface of the crucible walls, may act like a releasing agent to allow the deposition metal to more easily separate from the crucible walls. It should be noted that the term "releasing agent" used herein is intended to describe the function of the nitride material in the formed crucible, e.g., facilitating separation of the (solidified) metal from the crucible walls. The term "releasing agent" does not necessarily imply or exclude the possibility of releasing the nitride material from the crucible. It is believed that because the nitride material is at least partially encapsulated or held in the oxide material matrix, the nitride material may be formed into the matrix as an "interstitial" component, no releasing or substantially no releasing of the boron nitride material may occur to cause contamination. Yet, a small amount of the nitride material may remain exposed at the surface of the crucible, and the exposed nitride material may effectively function to prevent metal stickiness.

Without being bound by theory, it is believed that the particular amounts of the nitride material (and weight ratios of nitride material with other components) are important in achieving the aforementioned benefits (these amounts and ratios are discussed in more detail below). Specifically, when the amount of the nitride material is too low, some metal sticking or adhering to the crucible surface may still be observed. When the amount of the nitride material is too high, the excessive amount of the nitride material may cause friability issues. For example, when an excessive amount of the nitride material is utilized, not all the oxide material and/or the nitride material may be sufficiently fused together during processing, such as heat treatment, and chalky powder may result. This chalky powder is detrimental because it may contaminate the materials to be deposited or cause other undesirable consequences. The inventors have found that when the amount of nitride material falls within the aforementioned ranges, the formed crucible exhibits superior performance.

In addition, the crucibles disclosed herein provided for many other performance features and properties that are superior to those of conventional crucibles. For example, the crucibles described herein can operate at a wide range of temperatures, especially at the higher temperatures at which deposition takes place. The crucibles described herein also exhibit superior durability that allows the crucibles to withstand multiple heating/cooling cycles (cycles of heating up to extremely high temperatures and cooling down to room temperature) and/or to withstand multiple cleaning cycles, e.g., in a strong acid. The crucibles described herein have also been found to advantageously minimize outgassing and contamination to the metal to be deposited and/or to the deposition chamber. The compositions and processes for making the crucibles allow for crucibles of many desired shapes and sizes to be formed.

In some embodiments, this disclosure relates to a crucible having a heat treated body. The heat treated body comprises a composition including an oxide material, a nitride material, optionally present in an amount ranging from 10 wt % to 50 wt %), and an optional sintering aid. A weight ratio of the nitride material to the oxide material ranges from 0.05:1 to 2.0:1. The heat treated body has an oxide material lattice structure with nitride material encapsulated therein. Beneficially, this oxide material lattice structure provides for (at least in part) the aforementioned non-stickiness. Also, without being bound to theory, it is believed that the lattice structure around the nitride material holds the nitride material in the lattice, which, also advantageously reduces friability. In some cases, the amounts and ratios of the oxide material and the nitride material achieve a synergistic balance so as to improve both non-stickiness and friability. In addition, the disclosed compositions reduce or eliminate the formation of chalky powders and the problems associated therewith.

Oxide Material

As discussed above, the precursor composition may include an oxide material and the oxide material may vary widely, as long as the oxide material can be processed into a ceramic composition with the other precursor composition materials described herein. The oxide material may include one or more metal oxides, e.g., two or more or five or more.

In some embodiments, the oxide material may comprise aluminum oxide, beryllium oxide, or yttrium oxide, or combinations thereof. In some embodiments, the oxide material comprises aluminum oxide. In some embodiments, the oxide material comprises beryllium oxide. In some embodiments, the oxide material comprises yttrium oxide.

In some embodiments, the precursor composition comprises the oxide material in an amount ranging from 50 wt % to 90 wt %, from 50 wt % to 85 wt %, from 50 wt % to 80 wt %, from 50 wt % to 75 wt %, from 50 wt % to 70 wt %, from 50 wt % to 65 wt %, from 50 wt % to 60 wt %, from 50 wt % to 55 wt %, from 55 wt % to 90 wt %, from 55 wt % to 85 wt %, from 55 wt % to 80 wt %, from 55 wt % to 75 wt %, from 55 wt % to 70 wt %, from 55 wt % to 65 wt %, from 55 wt % to 60 wt %, from 60 wt % to 90 wt %, from 60 wt % to 85 wt %, from 60 wt % to 80 wt %, from 60 wt % to 75 wt %, from 60 wt % to 70 wt %, from 60 wt % to 65 wt %, from 65 wt % to 90 wt %, from 65 wt % to 85 wt %, from 65 wt % to 80 wt %, from 65 wt % to 75 wt %, from 65 wt % to 70 wt %, from 70 wt % to 90 wt %, from 80 wt % to 90 wt %, from 74 wt % to 94 wt %, from 81 wt % to 87 wt %, from 70 wt % to 85 wt %, from 70 wt % to 80 wt %, from 70 wt % to 75 wt %, from 75 wt % to 90 wt %, from 75 wt % to 85 wt %, from 75 wt % to 80 wt %, from 80 wt % to 90 wt %, from 80 wt % to 85 wt %, or from 85 wt % to 90 wt %, measured as dry weight percentage of the precursor composition.

In terms of lower limits, the precursor composition may comprise the oxide material in an amount greater than 50 wt %, greater than 55 wt %, greater than 60 wt %, greater than 65 wt %, greater than 70 wt %, greater than 75 wt %, greater than 80 wt %, greater than 85 wt %, or greater than 90 wt % of the precursor composition. In terms of upper limits, the precursor composition may comprise the oxide material in an amount less than 90 wt %, less than 88 wt %, less than 86 wt %, less than 85 wt %, less than 80 wt %, less than 75 wt %, less than 70 wt %, less than 65 wt %, less than 60 wt %, or less than 55 wt % of the precursor composition.

In some embodiments, the oxide material includes aluminum oxide, and the aluminum oxide may be utilized at any of the amount ranges or amount limits listed above. In some embodiments, the oxide material may include beryllium oxide, and the beryllium oxide may be utilized at any of the amount ranges or amount limits listed above. In some embodiments, the oxide material may include a combination of aluminum oxide and beryllium oxide, the of aluminum oxide and beryllium oxide, combined, may be utilized any of the amount ranges or amount limits listed above.

In cases where aluminum oxide and beryllium oxide are employed, a weight ratio of aluminum oxide to beryllium oxide may range from 10:1 to 0.1:1, e.g., from 10:1 to 0.25:1, from 10:1 to 0.5:1, from 10:1 to 0.75:1, from 10:1 to 1:1, from 10:1 to 2:1, from 10:1 to 3:1, from 10:1 to 4:1, from 10:1 to 5:1, from 10:1 to 6:1, from 10:1 to 7:1, from 10:1 to 8:1, from 10:1 to 9:1, from 9:1 to 0.1:1, from 9:1 to 0.25:1, from 9:1 to 0.5:1, from 9:1 to 0.75:1, from 9:1 to 1:1, from 9:1 to 2:1, from 9:1 to 3:1, from 9:1 to 4:1, from 9:1 to 5:1, from 9:1 to 6:1, from 9:1 to 7:1, from 9:1 to 8:1, from 8:1 to 0.1:1, from 8:1 to 0.25:1, from 8:1 to 0.5:1, from 8:1 to 0.75:1, from 8:1 to 1:1, from 8:1 to 2:1, from 8:1 to 3:1, from 8:1 to 4:1, from 8:1 to 5:1, from 8:1 to 6:1, from 8:1 to 7:1, from 7:1 to 0.1:1, from 7:1 to 0.25:1, from 7:1 to 0.5:1, from 7:1 to 0.75:1, from 7:1 to 1:1, from 7:1 to 2:1, from 7:1 to 3:1, from 7:1 to 4:1, from 7:1 to 5:1, from 7:1 to 6:1, from 6:1 to 0.1:1, from 6:1 to 0.25:1, from 6:1 to 0.5:1, from 6:1 to 0.75:1, from 6:1 to 1:1, from 6:1 to 2:1, from 6:1 to 3:1, from 6:1 to 4:1, from 6:1 to 5:1, from 5:1 to 0.1:1, from 5:1 to 0.25:1, from 5:1 to 0.5:1, from 5:1 to 0.75:1, from 5:1 to 1:1, from 5:1 to 2:1, from 5:1 to 3:1, from 5:1 to 4:1, from 4:1 to 0.1:1, from 4:1 to 0.25:1, from 4:1 to 0.5:1, from 4:1 to 0.75:1, from 4:1 to 1:1, from 4:1 to 2:1, from 4:1 to 3:1, from 3:1 to 0.1:1, from 3:1 to 0.25:1, from 3:1 to 0.5:1, from 3:1 to 0.75:1, from 3:1 to 1:1, from 3:1 to 2:1, from 2:1 to 0.1:1, from 2:1 to 0.25:1, from 2:1 to 0.5:1, from 2:1 to 0.75:1, from 2:1 to 1:1, from 1:1 to 0.1:1, from 1:1 to 0.25:1, from 1:1 to 0.5:1, from 1:1 to 0.75:1, from 0.75:1 to 0.1:1, from 0.75:1 to 0.25:1, from 0.75:1 to 0.5:1, from 0.5:1 to 0.1:1, from 0.5:1 to 0.25:1, or from 0.25:1 to 0.1:1. It has been found by the inventors that both aluminum oxide and beryllium oxide provide for superior crucible properties, with the crucible containing more aluminum oxide than beryllium oxide beneficially being slightly less friable and less hazardous.

In terms of lower limits, the weight ratio of aluminum oxide to beryllium oxide may be greater than 0.1:1, e.g., greater than 0.25:1, greater than 0.5:1, greater than 0.75:1, greater than 1:1, greater than 2:1, greater than 3:1, greater than 4:1, greater than 5:1, greater than 6:1, greater than 7:1, greater than 8:1, greater than 9:1, or greater than 10:1. In terms of upper limits, the weight ratio of aluminum oxide to beryllium oxide may be less than 10:1, less than 9:1, less than 8:1, less than 7:1, less than 6:1, less than 5:1, less than 4:1, less than 3:1, less than 2:1, less than 1:1, less than 0.75:1, less than 0.5:1, or less than 0.25:1.

In some embodiments, the oxide material may further include yttrium oxide combined with at least one of aluminum oxide and/or beryllium oxide. The amount of yttrium oxide may range from 1 wt % to 10 wt %, e.g., from 1 wt % to 9 wt %, from 1 wt % to 8 wt %, from 1 wt % to 7 wt %, from 1 wt % to 6 wt %, from 1 wt % to 5 wt %, from 1 wt % to 4 wt %, from 1 wt % to 3 wt %, from 1 wt % to 2 wt %, from 2 wt % to 10 wt %, from 2 wt % to 9 wt %, from 2 wt % to 8 wt %, from 2 wt % to 7 wt %, from 2 wt % to 6 wt %, from 2 wt % to 5 wt %, from 2 wt % to 4 wt %, from 2 wt % to 3 wt %, from 3 wt % to 10 wt %, from 3 wt % to 9 wt %, from 3 wt % to 8 wt %, from 3 wt % to 7 wt %, from 3 wt % to 6 wt %, from 3 wt % to 5 wt %, from 3 wt % to 4 wt %, from 4 wt % to 10 wt %, from 4 wt % to 9 wt %, from 4 wt % to 8 wt %, from 4 wt % to 7 wt %, from 4 wt % to 6 wt %, from 4 wt % to 5 wt %, from 5 wt % to 10 wt %, from 5 wt % to 9 wt %, from 5 wt % to 8 wt %, from 5 wt % to 7 wt %, from 5 wt % to 6 wt %, from 6 wt % to 10 wt %, from 6 wt % to 9 wt %, from 6 wt % to 8 wt %, from 6 wt % to 7 wt %, from 7 wt % to 10 wt %, from 7 wt % to 9 wt %, from 7 wt % to 8 wt %, from 8 wt % to 10 wt %, from 8 wt % to 9 wt %, or from 9 wt % to 10 wt %.

In terms of lower limits, the amount of yttrium oxide may be greater than 1 wt %, e.g., greater than 1.4 wt %, greater than 2 wt %, greater than 3 wt %, greater than 4 wt %, greater than 5 wt %, greater than 6 wt %, greater than 7 wt %, greater than 8 wt %, or greater than 9 wt %. In terms of upper limits, the amount of yttrium oxide may be less than 10 wt %, e.g., less than 9 wt %, less than 8 wt %, less than 7 wt %, less than 6 wt %, less than 5 wt %, less than 4 wt %, less than 3 wt %, or less than 2 wt %. The inventors have found that the addition of yttrium oxide may contribute to improved performance properties, e.g., toughness and/or optical properties.

Nitride Material

As discussed above, the precursor composition may include a nitride material. The nitride material may include boron nitride. In some embodiments, the precursor composition may include an amount of nitride material, measured as dry weight percentage of the precursor composition, ranging from 5 wt % to 50 wt %, e.g., from 10 wt % to 50 wt %, from 10 wt % to 45 wt %, from 10 wt % to 40 wt %, from 10 wt % to 35 wt %, from 10 wt % to 20 wt %, from 5 wt % to 25 wt %, from 12 wt % to 18 wt %, from 10 wt % to 30 wt %, from 10 wt % to 25 wt %, from 10 wt % to 20 wt %, from 10 wt % to 15 wt %, from 15 wt % to 50 wt %, from 15 wt % to 45 wt %, from 15 wt % to 40 wt %, from 15 wt % to 35 wt %, from 15 wt % to 30 wt %, from 15 wt % to 25 wt %, from 15 wt % to 20 wt %, from 20 wt % to 50 wt %, from 20 wt % to 45 wt %, from 20 wt % to 40 wt %, from 20 wt % to 35 wt %, from 20 wt % to 30 wt %, from 20 wt % to 25 wt %, from 25 wt % to 50 wt %, from 25 wt % to 45 wt %, from 25 wt % to 40 wt %, from 25 wt % to 35 wt %, from 25 wt % to 30 wt %, from 30 wt % to 50 wt %, from 30 wt % to 45 wt %, from 30 wt % to 40 wt %, from 30 wt % to 35 wt %, from 35 wt % to 50 wt %, from 35 wt % to 45 wt %, from 35 wt % to 40 wt %, from 40 wt % to 50 wt %, from 40 wt % to 45 wt %, or from 45 wt % to 50 wt %.

In terms of lower limits, the precursor composition may comprise the nitride material in an amount greater than 5 wt %, e.g., greater than 10 wt %, greater than 12 wt %, greater than 15 wt %, greater than 20 wt %, greater than 25 wt %, greater than 30 wt %, greater than 35 wt %, greater than 40 wt %, or greater than 45 wt %. In terms of upper limits, the nitride material may be less than 50 wt %, e.g., less than 45 wt %, less than 40 wt %, less than 35 wt %, less than 30 wt %, less than 25 wt %, less than 20 wt %, less than 18 wt %, or less than 15 wt %.

Without being bound by theory, it is postulated that the nitride material, such as boron nitride, may be impervious to the sintering conditions to which the precursor compound is subjected. In some cases, the oxide material in the precursor material may sinter and (at least some of) the nitride material may not. The resultant structure may allow the boron nitride to act like a releasing agent to facilitate separation of the cooled, solid metal, such as silver, from the crucible surface.

As further discussed above, it is believed the oxide material forms a lattice structure around the nitride material to hold or encapsulate at least a portion of the nitride material particles in the lattice to form the heat treated body of the crucible. To facilitate the lattice structure formation, a weight ratio of the nitride material to the oxide material may range from 0.02:1 to 2.0:1, e.g., from 0.05:1 to 2.0:1, from 0.05:1 to 1.75:1, from 0.05:1 to 1.5:1, from 0.05:1 to 1.25:1, from 0.05:1 to 1.0:1, from 0.05:1 to 0.75:1, from 0.05:1 to 0.5:1, from 0.05:1 to 0.25:1, from 0.05:1 to 0.1:1, from 0.1:1 to 2.0:1, from 0.1:1 to 1.75:1, from 0.1:1 to 1.5:1, from 0.1:1 to 1.25:1, from 0.1:1 to 1.0:1, from 0.1:1 to 0.75:1, from 0.1:1 to 0.5:1, from 0.1:1 to 0.25:1, from 0.25:1 to 2.0:1, from 0.25:1 to 1.75:1, from 0.25:1 to 1.5:1, from 0.25:1 to 1.25:1, from 0.25:1 to 1.0:1, from 0.25:1 to 0.75:1, from 0.25:1 to 0.5:1, from 0.5:1 to 2.0:1, from 0.5:1 to 1.75:1, from 0.5:1 to 1.5:1, from 0.5:1 to 1.25:1, from 0.5:1 to 1.0:1, from 0.5:1 to 0.75:1, from 0.75:1 to 2.0:1, from 0.75:1 to 1.75:1, from 0.75:1 to 1.5:1, from 0.75:1 to 1.25:1, from 0.75:1 to 1.0:1, from 1.0:1 to 2.0:1, from 1.0:1 to 1.75:1, from 1.0:1 to 1.5:1, from 1.0:1 to 1.25:1, from 1.25:1 to 2.0:1, from 1.25:1 to 1.75:1, from 1.25:1 to 1.5:1, from 1.5:1 to 2.0:1, from 1.5:1 to 1.75:1, or from 1.75:1 to 2.0:1.

In terms of lower limits, the weight ratio of the nitride material to the oxide material may be greater than 0.02:1, e.g., greater than 0.1:1, greater than 0.05:1, greater than 0.25:1, greater than 0.5:1, greater than 0.75:1, greater than 1.0:1, greater than 1.25:1, greater than 1.5:1, or greater than 1.75:1. In terms of upper limits, the weight ratio of the nitride material to the oxide material may be less than 2.0:1, e.g., less than 1.75:1, less than 1.5:1, less than 1.25:1, less than 1.0:1, less than 0.75:1, less than 0.5:1, less than 0.25:1, or less than 0.1:1.

As discussed above, at least a portion of the nitride material particles, e.g., boron nitride particles, may become (at least partially) encapsulated in the oxide material lattice structure formed by the precursor composition. In some cases, the amount of encapsulated nitride material is less than the amount of total nitride material in the precursor composition.

In some embodiments, the nitride material amount that may be at least partially encapsulated may range from 5 wt % to 50 wt %, measured as dry weight percentage of the precursor composition. For example, the nitride material that may be encapsulated may range from 5 wt % to 50 wt %, e.g., from 10 wt % to 50 wt %, from 10 wt % to 45 wt %, from 10 wt % to 40 wt %, from 10 wt % to 35 wt %, from 10 wt % to 30 wt %, from 10 wt % to 25 wt %, from 10 wt % to 20 wt %, from 10 wt % to 15 wt %, from 15 wt % to 50 wt %, from 15 wt % to 45 wt %, from 15 wt % to 40 wt %, from 15 wt % to 35 wt %, from 15 wt % to 30 wt %, from 15 wt % to 25 wt %, from 15 wt % to 20 wt %, from 20 wt % to 50 wt %, from 20 wt % to 45 wt %, from 20 wt % to 40 wt %, from 20 wt % to 35 wt %, from 20 wt % to 30 wt %, from 20 wt % to 25 wt %, from 25 wt % to 50 wt %, from 25 wt % to 45 wt %, from 25 wt % to 40 wt %, from 25 wt % to 35 wt %, from 25 wt % to 30 wt %, from 30 wt % to 50 wt %, from 30 wt % to 45 wt %, from 30 wt % to 40 wt %, from 30 wt % to 35 wt %, from 35 wt % to 50 wt %, from 35 wt % to 45 wt %, from 35 wt % to 40 wt %, from 40 wt % to 50 wt %, from 40 wt % to 45 wt %, or from 45 wt % to 50 wt %.

In terms of lower limits, the nitride material that may be at least partially encapsulated may be greater than 5 wt %, e.g., greater than 10 wt %, greater than 15 wt %, greater than 20 wt %, greater than 25 wt %, greater than 30 wt %, greater than 35 wt %, greater than 40 wt %, or greater than 45 wt %. In terms of upper limits, the nitride material that may be at least partially encapsulated may be less than 50 wt %, less than 45 wt %, less than 40 wt %, less than 35 wt %, less than 30 wt %, less than 25 wt %, less than 20 wt %, or less than 15 wt %.

In some embodiments, in the heat treated bodies of the crucibles, the nitride material, e.g., boron nitride, may comprise less than 50% of a surface area of the heat treated body, such as a surface area of an exterior and/or interior surface of the heat treated body. For example, the nitride material may comprise less than 45%, e.g., less than 40%, less than 35%, less than 30%, less than 25%, less than 20%, less than 15%, less than 10%, less than 5%, less than 3%, less than 1%, or less of the surface area of the heat treated body. In terms of ranges, the nitride material may comprise from 1% to 50% of the surface area of the heated body in some embodiments, e.g., from 1% to 45%, from 1% to 40%, from 1% to 35%, from 1% to 30%, from 1% to 25%, from 1% to 20%, from 1% to 15%, from 1% to 10%, from 1% to 5%, from 5% to 50%, from 5% to 45%, from 5% to 40%, from 5% to 35%, from 5% to 30%, from 5% to 25%, from 5% to 20%, from 5% to 15%, from 5% to 10%, from 10% to 50%, from 10% to 45%, from 10% to 40%, from 10% to 35%, from 10% to 30%, from 10% to 25%, from 10% to 20%, from 10% to 15%, from 15% to 50%, from 15% to 45%, from 15% to 40%, from 15% to 35%, from 15% to 30%, from 15% to 25%, from 15% to 20%, from 20% to 50%, from 20% to 45%, from 20% to 40%, from 20% to 35%, from 20% to 30%, from 20% to 25%, from 25% to 50%, from 25% to 45%, from 25% to 40%, from 25% to 35%, from 25% to 30%, from 30% to 50%, from 30% to 45%, from 30% to 40%, from 30% to 35%, from 35% to 50%, from 35% to 45%, from 35% to 40%, from 40% to 50%, from 40% to 45%, or from 45% to 50% in various embodiments.

Sintering Aid

As discussed above, the precursor composition may include a sintering aid. The sintering aid may vary widely, and any sintering aid may be used so long as it is non-reactive (relative to what the crucible will hold) and not a sacrificial sinter aid. The sintering aid acts as a wetting agent that allows the oxide material and nitride material particles to fully fuse together during the sintering process at lower temperatures than would otherwise be required. The sintering aid may include metal, oxide, or any suitable sintering aids, such as one or more rare earth elements, fumed silica, magnesium oxide, yttria, petalite, tetraethyl orthosilicate, or magnesium trisilicate, or combinations thereof.

In some embodiments, the amount of the sintering aid, measured as weight percentage of the precursor composition, may range from 0.5 wt % to 5 wt %, e.g., from 0.5 wt % to 4 wt %, from 0.5 wt % to 3 wt %, from 0.5 wt % to 2 wt %, from 0.5 wt % to 1 wt %, from 1 wt % to 5 wt %, from 1 wt % to 4 wt %, from 1 wt % to 3 wt %, from 1 wt % to 2 wt %, from 2 wt % to 5 wt %, from 2 wt % to 4 wt %, from 2 wt % to 3 wt %, from 3 wt % to 5 wt %, from 3 wt % to 4 wt %, or from 4 wt % to 5 wt %. In terms of lower limits, the amount of sintering aid may be greater than 0.5 wt %, greater than 1 wt %, greater than 2 wt %, greater than 3 wt %, or greater than 4 wt %. In terms of lower limits, the amount of sintering aid may be less than 5 wt %, less than 4 wt %, less than 3 wt %, less than 2 wt %, or less than 1 wt %. The amounts and limits of the sintering aid described herein effectively reduces friability of the heat treated composition.

In some embodiments, the weight ratio of the nitride material to the sintering aid may range from 1.5:1 to 100:1, e.g., from 2:1 to 100:1, from 2:1 to 90:1, from 2:1 to 80:1, from 2:1 to 70:1, from 2:1 to 60:1, from 2:1 to 50:1, from 2:1 to 40:1, from 2:1 to 30:1, from 2:1 to 20:1, from 2:1 to 10:1, from 2:1 to 5:1, from 5:1 to 100:1, from 5:1 to 90:1, from 5:1 to 80:1, from 5:1 to 70:1, from 5:1 to 60:1, from 5:1 to 50:1, from 5:1 to 40:1, from 5:1 to 30:1, from 5:1 to 20:1, from 5:1 to 10:1, from 10:1 to 100:1, from 10:1 to 90:1, from 10:1 to 80:1, from 10:1 to 70:1, from 10:1 to 60:1, from 10:1 to 50:1, from 10:1 to 40:1, from 10:1 to 30:1, from 10:1 to 20:1, from 20:1 to 100:1, from 20:1 to 90:1, from 20:1 to 80:1, from 20:1 to 70:1, from 20:1 to 60:1, from 20:1 to 50:1, from 20:1 to 40:1, from 20:1 to 30:1, from 30:1 to 100:1, from 30:1 to 90:1, from 30:1 to 80:1, from 30:1 to 70:1, from 30:1 to 60:1, from 30:1 to 50:1, from 30:1 to 40:1, from 40:1 to 100:1, from 40:1 to 90:1, from 40:1 to 80:1, from 40:1 to 70:1, from 40:1 to 60:1, from 40:1 to 50:1, from 50:1 to 100:1, from 50:1 to 90:1, from 50:1 to 80:1, from 50:1 to 70:1, from 50:1 to 60:1, from 60:1 to 100:1, from 60:1 to 90:1, from 60:1 to 80:1, from 60:1 to 70:1, from 70:1 to 100:1, from 70:1 to 90:1, from 70:1 to 80:1, from 80:1 to 100:1, from 80:1 to 90:1, or from 90:1 to 100:1.

In terms of lower limits, the weight ratio of the nitride material to the sintering aid may be greater than 1.5:1, e.g., greater than 2:1, greater than 5:1, greater than 10:1, greater than 20:1, greater than 30:1, greater than 40:1, greater than 50:1, greater than 60:1, greater than 70:1, greater than 80:1, or greater than 90:1. In terms of upper limits, the weight ratio of the nitride material to the sinter aid may be less than 100:1, less than 90:1, less than 80:1, less than 70:1, less than 60:1, less than 50:1, less than 40:1, less than 30:1, less than 20:1, less than 10:1, or less than 5:1.

It is postulated that during the heat treatment, the nitride material may be impervious to the heat treating conditions, while the oxide material will sinter or be fused together and form to oxide matrix that holds or encapsulates the nitride material as an interstitial component in the heat treated body.

Additionally, when the precursor composition is heat treated into the heat treated composition, the amounts of the oxide material, the nitride material, and/or the sintering aid in the heat treated composition may be different from the amounts in the precursor composition. For example, the amount of nitride material, e.g., boron nitride, in the heat treated composition may be less than the amount of the boron nitride. In other words, the nitride material may be considered self-sacrificing during the heat treating process.

Co-products

When the precursor composition is processed into the heat treated composition to form the crucible, certain co-products or secondary products, other than those discussed above with respect to the precursor composition, may be formed during processing, e.g., sintering. Such co-products may include oxided boron and/or nitrided metal, such as nitrided aluminum, nitrided beryllium, and/or nitrided yttrium.

The amount of the co-products formed (individually or combined) may be less than 5 wt %, less than 4 wt %, less than 3 wt %, less than 2 wt %, less than 1 wt %, less than 0.5 wt %, or less than 0.1 wt % of the heat treated composition. In terms of ranges, the amount of co-products may range from 0.1 wt % to 5 wt %, from 0.1 wt % to 4 wt %, from 0.1 wt % to 3 wt %, from 0.1 wt % to 2 wt %, from 0.1 wt % to 1 wt %, from 0.1 wt % to 0.5 wt %, from 0.5 wt % to 5 wt %, from 0.5 wt % to 4 wt %, from 0.5 wt % to 3 wt %, from 0.5 wt % to 2 wt %, from 0.5 wt % to 1 wt %, from 1 wt % to 5 wt %, from 1 wt % to 4 wt %, from 1 wt % to 3 wt %, from 1 wt % to 2 wt %, from 2 wt % to 5 wt %, from 2 wt % to 4 wt %, from 2 wt % to 3 wt %, from 3 wt % to 5 wt %, from 3 wt % to 4 wt %, or from 4 to 5 wt %. In terms of lower limits, the amount of the co-product may be greater than 0.1 wt %, greater than 0.5 wt %, greater than 1 wt %, greater than 2 wt %, greater than 3 wt %, or greater than 4 wt %, in various embodiments.

Performance Characteristics

As discussed above, metal depositions are typically conducted under high heat, and many conventional crucibles lack the ability to withstand the high temperatures, such as greater than 1000° C., at which certain metals may be deposited. In some embodiments, the crucible described herein may operate to hold the molten metal at a temperature of greater than 1000° C., greater than 1100° C., greater than 1200° C., greater than 1300° C., greater than 1400° C., greater than 1500° C., greater than 1550° C., greater than 1600° C., greater than 1650° C., or greater than 1700° C.

As discussed above, the molten metal tends to stick or adhere to the surface of conventional crucibles once cooled to room temperature, which can cause the conventional crucible to crack or break. The crucible formed from the precursor composition as described herein limits or substantially beneficially avoids the metal sticking or adhering to the crucible surface. For example, by utilizing the described precursor compositions, the crucible formed from the precursor composition may have substantially no or very limited amount of the contacted surface area adhered to by the molten metal when operating at the temperatures noted above.

In terms of ranges, metal sticking to the crucible surface may be substantially avoided when the crucible operates at a temperature ranging from 1000° C. to 2500° C., e.g., from 1000° C. to 2200° C., from 1000° C. to 2000° C., from 1100° C. to 2000° C., from 1100° C. to 1900° C., from 1100° C. to 1800° C., from 1200° C. to 2000° C., from 1200° C. to 1800° C., from 1500° C. to 2000° C., from 1400° C. to 2000° C., from 1400° C. to 1900° C., or from 1300° C. to 1900° C.

In terms of lower limits, the metal sticking to the crucible surface may be substantially avoided when the crucible operates at a temperature greater than 1000° C., e.g., greater than 1100° C., greater than 1200° C., greater than 1300° C., greater than 1400° C., greater than 1500° C., greater than 1600° C., or greater than 1700° C. In terms of upper limits, the metal sticking to the crucible surface may be substantially avoided when the crucible operates at a temperature less than 2500° C., e.g., less than 2200° C., less than 2000° C., less than 1900° C., less than 1800° C., less than 1700° C., or less than 1600° C.

In some cases, when the crucible are employed within any of the aforementioned temperature ranges or limits, the respective walls of the crucible may have less than 5%, e.g., less than 4%, less than 3%, less than 2%, less than 1%, less than 0.5%, or less than 0.1% of the contacted surface area adhered to by the molten metal, depending on the crucible composition and the metal held by the crucible. In terms of ranges, the crucible described herein may have from 0.1% to 5%, from 0.1% to 4%, from 0.1% to 3%, from 0.1% to 2%, from 0.1% to 1%, from 0.1% to 0.5%, from 0.5% to 5%, from 0.5% to 4%, from 0.5% to 3%, from 0.5% to 2%, from 0.5% to 1%, from 1% to 5%, from 1% to 4%, from 1% to 3%, from 1% to 2%, from 2% to 5%, from 2% to 4%, from 2% to 3%, from 3% to 5%, from 3% to 4%, or from 4% to 5% of the contacted surface area adhered to by the molten metal during operation.

In some embodiments, the wetting angle or contact angle of the molten metal may be greater than 90 degrees. Depending on the crucible composition and the molten metal, the wetting angle may be greater than 90 degrees, e.g., greater than 100 degrees, greater than 110 degrees, greater than 120 degrees, greater than 130 degrees, greater than 140 degrees, greater than 150 degrees, greater than 160 degrees, or greater than 170 degrees. In terms of ranges, the wetting angle of the molten metal may range from 90 degrees to 170 degrees, e.g., from 90 degrees to 160 degrees, from 90 degrees to 150 degrees, from 90 degrees to 140 degrees, from 90 degrees to 130 degrees, from 90 degrees to 120 degrees, from 90 degrees to 110 degrees, from 90 degrees to 100 degrees, from 100 degrees to 170 degrees, from 100 degrees to 160 degrees, from 100 degrees to 150 degrees, from 100 degrees to 140 degrees, from 100 degrees to 130 degrees, from 100 degrees to 120 degrees, from 100 degrees to 110 degrees, from 110 degrees to 170 degrees, from 110 degrees to 160 degrees, from 110 degrees to 150 degrees, from 110 degrees to 140 degrees, from 110 degrees to 130 degrees, from 110 degrees to 120 degrees, from 120 degrees to 170 degrees, from 120 degrees to 160 degrees, from 120 degrees to 150 degrees, from 120 degrees to 140 degrees, from 120 degrees to 130 degrees, from 130 degrees to 170 degrees, from 130 degrees to 160 degrees, from 130 degrees to 150 degrees, from 130 degrees to 140 degrees, from 140 degrees to 170 degrees, from 140 degrees to 160 degrees, from 140 degrees to 150 degrees, from 150 degrees to 170 degrees, from 150 degrees to 160 degrees, or from 160 degrees to 170 degrees. In some cases, wetting angle is used to characterize the degree of stickiness. Thus, the described crucibles, may demonstrate the aforementioned wetting angle ranges and limits and, as such, may be considered to be advantageously non-sticky.

As discussed above, because the deposition is typically conducted under low pressure conditions, such as $10^{-6}$ vacuum ($10^{-6}$ torr), outgassing may occur partly due to degradation of the conventional crucibles at elevated deposition temperature, and impurities may be released from conventional crucibles, causing contamination of the metal to be deposited. Because the crucible described herein does not degrade at the elevated deposition temperature, the crucible described herein does not have the outgassing issues associated with conventional crucibles. In some cases, the crucibles demonstrate total mass loss outgassing less than 0.1%, e.g., less than 0.08%, less than 0.07%, less than 0.05%, less than 0.03%, less than 0.025%, less than 0.02%, or less than 0.01%. In some cases, the crucibles demonstrate collected volume condensable material loss outgassing less than 0.1%, e.g., less than 0.08%, less than 0.07%, less than 0.05%, less than 0.03%, less than 0.025%, less than 0.02%, less than 0.015%, less than 0.01%, or less than 0.005%. In some cases, the crucibles demonstrate total water vapor loss loss outgassing less than 0.1%, e.g., less than 0.08%, less than 0.07%, less than 0.05%, less than 0.03%, less than 0.025%, less than 0.02%, less than 0.015%, less than 0.01%, or less than 0.005%.

Further, the crucible described herein is chemically stable and non-reactive with the molten metal at the deposition temperature. Thus, the crucible does not contaminate the metal to be deposited during deposition.

As discussed above, the cost associated with conventional crucibles for metal depositions can be high partly because they cannot avoid metal sticking or adhering to the crucible surface and/or partly because they cannot withstand the many cycles of cleaning in acid, such as 68% nitric acid. Thus, conventional crucibles tend to break or degrade during operations, maintenance, and/or handling. As noted above, the crucibles described herein avoid metal sticking or adhering to the crucible surface, and are thus less likely to crack. Further, the crucibles described herein may have limited or no reactivity with strong acids, e.g., nitric acid, which may be employed in cleaning cycles. Thus, the crucible described herein may undergo at least 10 cycles of cleaning, e.g., with 68% nitric acid, without significant degradation, e.g., maintaining a substantially smooth surface texture, retaining at least 99% of its initial hardness, etc. For example, after 10 cycles of cleaning with 68% nitric acid, the crucible described herein may retain from 70% to 99.9%, e.g., from 70% to 99%, from 70% to 95%, from 70% to 90%, from 70% to 85%, from 70% to 80%, from 70% to 75%, from 75% to 99%, from 75% to 95%, from 75% to 90%, from 75% to 85%, from 75% to 80%, from 80% to 99%, from 80% to 95%, from 80% to 90%, from 80% to 85%, from 85% to 99%, from 85% to 95%, from 85% to 90%, from 90% to 99%, from 90% to 95%, from 95% to 99%, of its initial hardness. In terms of lower limits, the crucible described herein may retain at least 70%, e.g., at least 75%, at least 80%, at least 85%, at least 90%, at least 95%, or at least 99%, of its initial hardness.

Based on the Mohs hardness scale, in some embodiments, the crucible described herein may have a hardness ranging from 2 to 10, e.g., from 2 to 9, from 2 to 8, from 3 to 9, from 3 to 8, from 3.5 to 7.5, from 4 to 8, from 4 to 7, from 4.5 to 7.5, or from 5 to 6. In terms of lower limits, the crucible described herein may have a Mohs hardness of at least 2, e.g., at least 2.5, at least 3, at least 3.5, at least 4, at least 4.5, at least 5, or at least 5.5. In terms of upper limits, the crucible described herein may have a Mohs hardness of less than 12, less than 11, less than 10, less than 9, less than 8, less than 7.5, less than 7, less than 6.5, less than 6, or less than 5.5.

In some embodiments, the crucible described herein may have a hardness ranging from 2 to 4, e.g., from 2 to 3.5, from 2 to 3, from 2 to 2.5, from 2.5 to 4, from 2.5 to 3.5, from 2.5 to 3, from 3 to 4, from 3 to 3.5, or from 3.5 to 4. In terms of lower limits, the crucible described herein may have a Mohs hardness of at least 2, e.g., at least 2.5, at least 3, or at least 3.5. In terms of upper limits, the crucible described herein may have a Mohs hardness of less than 4, less than 3.5, less than 3, or less than 2.5.

In some cases, the crucible surprisingly has a hardness less than that of the components used to make it, e.g., alumina, beryllium oxide, or boron nitride, e.g., less than 10.

As discussed above, the difference between the thermal properties of conventional crucibles and deposition metals that can stick thereto can lead to cracking of the crucible after heating up and cooling down. However, by employing the precursor compositions described herein, the resultant crucibles do not stick to the deposition metal. Thus, the described crucibles advantageously allow for a less stringent requirement as to the matching between the thermal properties of the crucible and the deposition metal, which eases processing and component selection parameters. For example, unlike the conventional crucibles, the crucibles described herein and the deposition metal may have significantly different thermal conductivities. Depending on the crucible and the deposition metal, the thermal conductivity of the crucible may be greater than, similar to, or less than the thermal conductivity of the deposition metal. In some embodiments the difference in thermal conductivity of the crucible and the thermal conductivity of the deposition metal, may be at least 5%, based on the thermal conductivity of the deposition metal, e.g., at least 10%, at least 15%, at least 20%, at least 25%, at least 30%, at least 3%, at least 40%, at least 45%, or at least 50%. The thermal conductivity of the crucible may range from 13.0 W/m·K to 23.0 W/m·K at room temperature, e.g., from 15.0 W/m·K to 21.0 W/m·K, or from 17.0 W/m·K to 19.0 W/m·K. In terms of lower limits, the thermal conductivity of the crucible may be at least 13.0 W/m·K, e.g., at least 15.0 W/m·K, or at least 17.0 W/m·K. In terms of upper limits, the thermal conductivity of the crucible may be less than 23.0 W/m·K, e.g., less than 21.0 W/m·K, or less than 19.0 W/m·K. The thermal conductivity of the crucible may range from 2.0 W/m·K to 12.0 W/m·K at 400° C., e.g., from 4.0 W/m·K to 10.0 W/m·K, or from 6.0 W/m·K to 8.0 W/m·K. In terms of lower limits, the thermal conductivity of the crucible may be at least 2.0 W/m·K, e.g., at least 4.0 W/m·K, or at least 6.0 W/m·K. In terms of upper limits, the thermal conductivity of the crucible may be less than 12.0 W/m·K, e.g., less than 10.0 W/m·K, or less than 8.0 W/m·K.

As also discussed above, conventional crucibles for metal depositions are also relatively small, which can limit the amount of metal contained, which in turn limits production throughput in the deposition process. Conventional crucibles are small because most boron nitride containing crucibles are formed via deposition processes, which are only capable of producing relatively thin-walled containers. By combining the oxide material with the nitride material, an entirely different formation process may be utilized which provides for a crucible of a much greater volume. Thus, the production limitations associated with boron nitride are beneficially overcome while retaining the non-stick properties of boron nitride.

In some embodiments, the crucible described herein may define a volume for holding a molten metal of at least 1 cm$^3$, e.g., at least 5 cm$^3$, at least 10 cm$^3$, at least 50 cm$^3$, at least 100 cm$^3$, at least 500 cm$^3$, at least 1000 cm$^3$, at least 2000 cm$^3$, at least 3000 cm$^3$, at least 4000 cm$^3$, or at least 5000 cm$^3$. In terms of upper limits, the volume of the crucible of the crucible for holding the molten metal may be less than 15000 cm$^3$, e.g, less than 10000 cm$^3$, less than 5000 cm$^3$, less than 4000 cm$^3$, less than 3000 cm$^3$, less than 2000 cm$^3$, less than 1000 cm$^3$, less than 500 cm$^3$, less than 100 cm$^3$, less than 50 cm$^3$, less than 10 cm$^3$, less than 5 cm$^3$, or less.

In terms of ranges, the volume of the crucible for holding the molten metal may range from 1 cm$^3$ to 15000 cm$^3$, e.g., from 1 cm$^3$ to 10000 cm$^3$, from 1 cm$^3$ to 5000 cm$^3$, from 1 cm$^3$ to 4000 cm$^3$, from 1 cm$^3$ to 3000 cm$^3$, from 1 cm$^3$ to 2000 cm$^3$, from 1 cm$^3$ to 1000 cm$^3$, from 1 cm$^3$ to 500 cm$^3$, from 1 cm$^3$ to 100 cm$^3$, from 1 cm$^3$ to 50 cm$^3$, from 1 cm$^3$ to 10 cm$^3$, from 1 cm$^3$ to 5 cm$^3$, from 5 cm$^3$ to 5000 cm$^3$, from 5 cm$^3$ to 4000 cm$^3$, from 5 cm$^3$ to 3000 cm$^3$, from 5 cm$^3$ to 2000 cm$^3$, from 5 cm$^3$ to 1000 cm$^3$, from 5 cm$^3$ to 500 cm$^3$, from 5 cm$^3$ to 100 cm$^3$, from 5 cm$^3$ to 50 cm$^3$, from 5 cm$^3$ to 10 cm$^3$, from 10 cm$^3$ to 5000 cm$^3$, from 10 cm$^3$ to 4000 cm$^3$, from 10 cm$^3$ to 3000 cm$^3$, from 10 cm$^3$ to 2000 cm$^3$, from 10 cm$^3$ to 1000 cm$^3$, from 10 cm$^3$ to 500 cm$^3$, from 10 cm$^3$ to 100 cm$^3$, from 10 cm$^3$ to 50 cm$^3$, from 50 cm$^3$ to 5000 cm$^3$, from 50 cm$^3$ to 4000 cm$^3$, from 50 cm$^3$ to 3000 cm$^3$, from 50 cm$^3$ to 2000 cm$^3$, from 50 cm$^3$ to 1000 cm$^3$, from 50 cm$^3$ to 500 cm$^3$, from 50 cm$^3$ to 100 cm$^3$, from 100 cm$^3$ to 5000 cm$^3$, from 100 cm$^3$ to 4000 cm$^3$, from 100 cm$^3$ to 3000 cm$^3$, from 100 cm$^3$ to 2000 cm$^3$, from 100 cm$^3$ to 1000 cm$^3$, from 100 cm$^3$ to 500 cm$^3$, from 500 cm$^3$ to 5000 cm$^3$, from 500 cm$^3$ to 4000 cm$^3$, from 500 cm$^3$ to 3000 cm$^3$, from 500 cm$^3$ to 2000 cm$^3$, from 500 cm$^3$ to 1000 cm$^3$, from 1000 cm$^3$ to 5000 cm$^3$, from 1000 cm$^3$ to 4000 cm$^3$, from 1000 cm$^3$ to 3000 cm$^3$, from 1000 cm$^3$ to 2000 cm$^3$, from 2000 cm$^3$ to 5000 cm$^3$, from 2000 cm$^3$ to 4000 cm$^3$, from 2000 cm$^3$ to 3000 cm$^3$, from 3000 cm$^3$ to 5000 cm$^3$, from 3000 cm$^3$ to 4000 cm$^3$, or from 4000 cm$^3$ to 5000 cm$^3$.

The composition described herein also allows the crucible having many different desired shapes to be formed. In some embodiments, the crucible described herein may have an average wall thickness ranging from 2 mm to 75 mm, e.g. from 2 mm to 50 mm, from 2 mm to 25 mm, from 5 mm to 25 mm, from 2 mm to 20 mm, from 2 mm to 15 mm, from 2 mm to 10 mm, from 2 mm to 5 mm, from 5 mm to 25 mm, from 5 mm to 20 mm, from 5 mm to 15 mm, from 5 mm to 10 mm, from 10 mm to 25 mm, from 10 mm to 20 mm, from 10 mm to 15 mm, from 15 mm to 25 mm, from 15 mm to 20 mm, or from 20 to 25 mm. In terms of upper limits, the crucible described herein may have an average wall thickness less than 75 nm, e.g., less than 50 mm, less than 25 mm, less than 20 mm, less than 15 mm, less than 10 mm, or less than 5 mm. In terms of lower limits, the crucible described herein may have an average wall thickness greater than 2 mm, greater than 5 mm, greater than 10 mm, greater than 15 mm, or greater than 20 mm. This wide range of wall thickness may allow for various shapes and/or sizes of the crucible to be formed.

The crucible described herein may include a heat treated density similar to the theoretical density of the precursor composition. For example, the crucible described herein may have a heat treated density ranging from 65% to 99% of the theoretical density of the precursor composition. The closer the heat treated density to the theoretical density, the more consistent the properties of the crucible may be. Depending on the precursor composition and/or the processing condition, the crucible described herein may have a heat treated density ranging from 65% to 99%, e.g., from 65% to 95%, from 65% to 90%, from 65% to 85%, from 65% to 80%, from 65% to 75%, from 65% to 70%, from 70% to 99%, from 70% to 95%, from 70% to 90%, from 70% to 85%, from 70% to 80%, from 70% to 75%, from 75% to 99%, from 75% to 95%, from 75% to 90%, from 75% to 85%, from 75% to 80%, from 80% to 99%, from 80% to 95%, from 80% to 90%, from 80% to 85%, from 85% to 99%, from 85% to 95%, from 85% to 90%, from 90% to 99%, from 90% to 95%, or from 95% to 99%.

As discussed above, some conventional crucibles, such as graphite crucibles may be able to withstand high deposition temperatures but can cause carbon contamination to the deposited material. The precursor composition and/or the crucible described may not include carbon and thus avoid carbon contamination to the deposited material. In terms of upper limits, the precursor composition and/or the crucible describe herein may include less than 1 wt % carbon, e.g., less than 0.5 wt % carbon, less than 0.1 wt % carbon, less than 0.05 wt % carbon, or less than 0.01 wt % carbon.

As will be described in more detail below, the precursor composition is processed in a manner such that the heat treated body of the crucible has a substantially uniform composition e.g., the components of the heat treated body are dispersed throughout in a homogeneous manner. The oxide material and/or the nitride material are distributed throughout heat treated body. As compared to conventional crucibles with a layered or coated structure, the uniform distribution of the various precursor components in the heat treated body of the crucible described herein achieves an effective balance of the properties of the oxide and nitride materials.

Process

This disclosure also relates to methods for producing the crucible. The precursor composition may be processed by heat treating, e.g., sintering, as will be described in more detail below. However, other appropriate processing methods may be implemented.

The process may comprise providing an oxide material, optionally in a powder form and providing a nitride material, optionally in a powder form. The amount of the oxide material and/or the nitride material may be provided in any of the amount discussed herein. The method may further include providing a sintering aid. The oxide material, the nitride material, and the sintering aid may then be mixed to form a precursor composition. The mixing of the oxide material, the nitride material, and the sintering aid may be performed using a mill, such as a ball mill, or using any other suitable milling equipment or techniques.

During milling, the size of the oxide and/or nitride powders and/or the sintering aid may be reduced, such as reduced to be below 10 microns, below 8 microns, below 5 microns, below 3 microns, or below 1 microns. The size of the milled oxide and/or nitride powders and/or the sintering aid may be substantially uniform or may vary between 10 microns and 1 microns, between 8 microns and 1 microns, between 5 microns to 1 microns, or between 3 microns to 1 microns. In terms of lower limits, the size of the milled oxide and/or nitride powders and/or the sintering aid may be no less than 1 microns, no less than 3 microns, or no less than 5 microns. Upon completion of the milling operation, the sizes of the oxide material, the nitride material, and the sintering aid may be similar, and the oxide material, the nitride material, and the sintering aid may form a substantially homogeneous mixture, which may be referred to as a precursor composition. Then, a binder may be added to the precursor composition and mixed with the precursor composition to form a uniformly mixed slurry.

The slurry may then be spray dried to form particles or agglomerates. Specifically, the slurry may be sprayed into a mist and dried into spheres in air at high temperatures to form particles or agglomerates. The spray dried particles or agglomerates may include the nitride material encapsulated by the oxide material. The spray dried particles or agglomerates may have an average diameter ranging from 40 microns to 120 microns. The distribution of the particle or agglomerate size may be a bell curve. The spray dried particles or agglomerates may then be pressed into shape and heat treated, such as sintered, to form the crucible. During shaping, the binder holds the components together to prevent separation of the components. Prior to sintering, the binder is removed by baking the shaped composition in air at a temperature at about 400° C. for about 60 minutes or at other temperatures and/or for other durations, depending on the binder utilized. The process may include a cold isostatic pressing, e.g., at room temperature, or a hot isostatic pressing. Cold isostatic pressing, is contemplated as a heat treatment method, even though it may not employ the higher temperatures of sintering or hot isostatic pressing. In some cases, the heat treating may include dry pressing, which in some cases, may be beneficial for smaller volume crucibles. The pressure may range from 13,000 to 60,000 psi. Beneficially, when the disclosed composition is employed, a cold isostatic pressing may be utilized.

The sintering operation may be conducted in vacuum, in ambient air, or in nitrogen or other inert gas. The inventors have found that it is beneficial to heat treat oxides in an oxygen environment so as to avoid the oxides reacting and changing chemical form. Likewise, it is beneficial to heat treat nitrides in a nitrogen environment to avoid the nitrides reacting and changing chemical form. By performing the sintering operation either in vacuum or in ambient air, which includes both oxygen and nitrogen, both the oxide material and the nitride material may advantageously be preserved. In some embodiments, a multi-step sintering process may be utilized. For example, the sintering process may include first bisque firing in air and then sintering in nitrogen.

The crucibles formed using the process described herein may include a heat treated composition that comprises the oxide material, the nitride material, and the sintering aid forming the precursor composition. However, the amounts of the oxide material, the nitride material, and/or the sintering aid in the heat treated composition may be different from the amounts in the precursor composition. For example, at least the nitride material may be partially self-sacrificing, and the amount of nitride material, e.g., boron nitride, in the heat treated composition may be less than the amount of the boron nitride.

Crucibles for metal depositions are described as exemplary applications of the various compositions and processing methods described herein. However, crucibles for other uses may be made using the various compositions and processing methods described herein. Further, the various compositions, and/or the processing methods may be used for other non-crucible applications where the properties provided by the compositions and/or the methods may be desired.

EXAMPLES

Example 1

Crucibles were prepared as follows. Powders comprising 75 wt %-85 wt aluminum oxide powder (oxide material) and 15 wt %-20 wt % of boron nitride powder (nitride material), and a sintering aid were mixed to combine. The combined mixture was molded into a crucible shape, which was then heat treated at a temperature ranging from 1400° C. to 1600° C. to form the crucibles.

The crucibles were tested for physical and performance parameters. The parameters and the measurements are disclosed in Table 1.

TABLE 1

Crucible Properties and Performance

| Property | Unit | Test Method | Value |
| --- | --- | --- | --- |
| Color | N/A | Visual | Off-white to Grey |
| Density | g/cc | ASTM C373-8 | 1.80 g/cc |
| Hardness | Vickers HV | ASTM E18-96 | 40-50 |
| Outgassing | Total Mass Loss (TML) | ASTM E 595-93 | 0.02% |
| | Collected Vol. Condensable Matl (CVCM) | | 0.01% |
| | Total Water Vapor Loss (WVL) | | <.01% |
| Acid Resistance | Percent weight loss | Percent weight lost, 68% nitric acid, 24 hrs., room temp. | <0.01 |
| Water Absorption | Percent | ASTM C20 | 7.4 |
| Thermal Conductivity | W/m · K | Laser Flash Method and Calorimeter | RT: 18.0<br>400° C.: 7.2 |
| Thermal Diffusivity | Mm$^2$/s | ASTM E1461-13 | RT: 11.0 |

TABLE 1-continued

Crucible Properties and Performance

| Property | Unit | Test Method | Value |
|---|---|---|---|
| CTE | $10^{-6}/°$ C. | ASTM E228-95 | 400° C.: 3.9<br>7.8<br>(Tested in air) |
| Thermal Shock Resistance | W/m | ASTM C351 | 1047.6 |
| Specific Heat | J/g°K | CTE × Young's mod. | RT: 0.89<br>1250° C.: 2.642 |
| Flexural Strength | MPa | ASTM D257-93 | 14.0 |
| Poisson's Ratio | — | ASTM F417-78 | 0.186 |
| Shear Modulus | GPa | ASTM E1876/C1259 | 21.7 |
| Young's Modulus | GPa | ASTM E1876/C1259 | 51.4 |
| Fracture Toughness | MPa-m$^{1/2}$ | ASTM E1876/C1259 | 0.5 |
| Volume Resistivity | ohm-cm @ RT | ASTM E1820-01 | $4.13 \times 10^{1°}$ |
| Dissipation Factor | 1 MHz @ RT | ASTM D257-93 | 0.030 |
| Dielectric Constant | 1 MHz @ RT | ASTM D150-95 | 4.11 |
| Dielectric Strength | ac-volts/mil @ RT | ASTM D150-95 | 180 |

*ASTM methods are from 2019 or current year.

As shown in Table 1, the crucibles of the present invention demonstrate significant improvements in both physical properties and in performance. For example the crucibles demonstrate superior coefficient of thermal expansion –7.8 $(10^{-6}/°$ C.).

Examples 2 and 3 and Comparative Examples A-H

Sample panels were prepared in a manner similar to that of crucible of Example 1. The panels were formed to be flat and rectangular in shape. The panels of Examples 2 and 3 and Comparative Examples A-H employed the powder or panel compositions shown in Table 2. Comparative Examples A-C, E, and F employed conventional (and in most cases commercially available) powders to form the panels; Comparative Examples D, G, and H utilized commercially available panels. Deposition metal (silver) tablets were placed on the panels and the panels were heated to typical working temperatures, e.g., over 1500° C., under lowered pressure (to limit metal evaporation) to melt the deposition metal. The panels were then cooled to room temperature, leaving a collected quantity of deposition metal. The panels were then tilted to facilitate removal of the deposition material. Adherence of deposition metal ("metal adhesion") to the panel surface was observed and analyzed. A "pass" score was given where little or no, e.g., less than 5% of the area of the panel, of the adhered deposition metal remained on the panel (without applying mechanical force to remove). A "fail" score was given when a mechanical force (other than gravity) was required to remove a significant portion, e.g., at least 5% of the area of the panel, of the adhered deposition metal.

TABLE 2

Crucible Stickiness Performance

| Ex./Comp. Ex. | Powder/Panel Composition | Metal Adhesion |
|---|---|---|
| 2 | 75 wt %-85 wt % Aluminum Oxide 15 wt %-20 wt % of Boron Nitride | Pass; essentially no adhered metal |
| 3 | 75 wt %-85 wt % Beryllium Oxide 15 wt %-20 wt % of Boron Nitride | Pass; essentially no adhered metal |
| A | Beryllium Oxide (100%) | Fail; force required to remove |
| B | Aluminum Nitride (100%) | Fail; force required to remove |
| C | Ytttium Aluminum Garnet (100%) | Fail; force required to remove |
| D | Sapphire (100%) | Fail; force required to remove |
| E | Aluminum Oxide (99.8% purity) | Fail; force required to remove |
| F | Aluminum Oxide (94.0% purity) | Fail; force required to remove |
| G | Graphite (100%) | Fail; force required to remove |
| H | Boron Nitride (100%) | Fail; wall cracking issues in some cases |

As shown in Table 2, Examples 2 and 3, formed from a combination of aluminum oxide or beryllium oxide and boron nitride demonstrated little to no deposition metal adhesion, e.g., less than 5% of the total surface area. In contrast, all of the Comparative Examples demonstrated significant deposition metal adhesion and required mechanical force to remove a significant portion, e.g., at least 5% of the total area, of the deposition metal. In some cases, the boron nitride crucibles demonstrated wall cracking problems, and deposition metal adhered to the cracks.

EMBODIMENTS

The following embodiments are contemplated. All combinations of features and embodiments are contemplated.

Embodiment 1: a crucible having a heat treated body, the heat treated body comprising a composition including an oxide material, from 5 wt % to 50 wt % a nitride material, and optionally a sintering aid. A weight ratio of the nitride material to the oxide material ranges from 0.02:1 to 2.0:1. The heat treated body has an oxide material lattice structure with nitride material at least partially encapsulated therein.

Embodiment 2: the embodiment of embodiment 1, wherein a weight ratio of the nitride material to sintering aid ranges from 2:1 to 100:1.

Embodiment 3: the embodiment of any of embodiments 1 and 2, wherein the oxide material comprises a metal oxide.

Embodiment 4: the embodiment of any of embodiments 1-3, wherein the oxide material comprises aluminum oxide, beryllium oxide, or yttrium oxide, or combinations thereof.

Embodiment 5: the embodiment of any of embodiments 1-4, wherein the oxide material comprises less than 10 wt % yttrium oxide.

Embodiment 6: the embodiment of any of embodiments 1-5, wherein the nitride material comprises boron nitride.

Embodiment 7: the embodiment of any of embodiments 1-6, wherein the sintering aid comprises rare earth metal, fumed silica, magnesium oxide, petalite, tetraethyl orthosilicate, or magnesium trisilicate, or combinations thereof.

Embodiment 8: the embodiment of any of embodiments 1-7, wherein at least 10% of the nitride material is at least partially encapsulated in the oxide material lattice structure.

Embodiment 9: the embodiment of any of embodiments 1-8, wherein in the heat treated body, boron nitride is at least partially encapsulated such that boron nitride comprises less than 50% of a surface area of an exterior surface of the heat treated body.

Embodiment 10: the embodiment of any of embodiments 1-9, wherein the encapsulation of the nitride material is achieved by heat treating a precursor composition to form the heat treated body comprising a heat treated composition, and wherein the precursor composition comprises an oxide material, a nitride material, and a sintering aid.

Embodiment 11: the embodiment of any of embodiments 1-10, wherein the precursor composition comprises an initial amount of boron nitride and the heat treated composition comprises a sintered amount of boron nitride and wherein the sintered amount is less than the sintered amount.

Embodiment 12: the embodiment of any of embodiments 1-11, wherein the heat treated body further comprises nitrided aluminum co-product.

Embodiment 13: the embodiment of any of embodiments 1-12, wherein the heat treated body further comprises oxided boron co-product.

Embodiment 14: the embodiment of any of embodiments 1-13, wherein the oxide material is distributed throughout heat treated body.

Embodiment 15: the embodiment of any of embodiments 1-14, wherein the nitride material is distributed throughout heat treated body.

Embodiment 16: the embodiment of any of embodiments 1-15, wherein the oxide material is not a coating of the heat treated body.

Embodiment 17: the embodiment of any of embodiments 1-16, wherein the nitride material is not a coating of the heat treated body.

Embodiment 18: the embodiment of any of embodiments 1-17, wherein, when contacted with molten metal at temperatures below 1700° C., less than 5% of the contacted surface area is adhered to by the molten metal.

Embodiment 19: the embodiment of any of embodiments 1-18, wherein, when contacted with molten metal at temperatures greater than or about 1550° C. or above, less than 5% of the contacted surface area is adhered to by the molten metal.

Embodiment 20: the embodiment of any of embodiments 1-19, wherein, when contacted with molten metal at temperatures greater than or about 1550° C., the wetting angle of the molten metal is greater than 90 degrees.

Embodiment 21: the embodiment of any of embodiments 1-20, wherein the heat treated body is non-reactive with the molten metal at the elevated temperature.

Embodiment 22: the embodiment of any of embodiments 1-21, wherein the heat treated body and the molten metal have different thermal conductivities.

Embodiment 23: the embodiment of any of embodiments 1-22, wherein the heat treated body is less thermally conductive than a molten metal the crucible is configured to hold for deposition.

Embodiment 24: the embodiment of any of embodiments 1-23, wherein the heat treated body defines a volume of 1 $cm^3$ to 5000 $cm^3$ for holding a molten metal.

Embodiment 25: the embodiment of any of embodiments 1-24, wherein the heat treated body has an average wall thickness ranging from 2 mm to 25 mm.

Embodiment 26: the embodiment of any of embodiments 1-25, wherein the heat treated body has limited reactivity with nitric acid.

Embodiment 27: the embodiment of any of embodiments 1-26, wherein, after exposure to at least 10 cycles of 68% nitric acid cleaning, the heat treated body retains at least 99% of the initial hardness.

Embodiment 28: the embodiment of any of embodiments 1-27, wherein the heat treated body has a density ranging from 65% to 99% of a theoretical density of the precursor composition.

Embodiment 29: the embodiment of any of embodiments 1-28, wherein the composition comprises less than 1 wt % carbon.

Embodiment 30, the embodiment of any of embodiments 1-29, wherein the composition of the heat treated body is substantially uniform.

Embodiment 31: a process for producing a crucible having a heat treated body, the method comprising: providing an oxide material, optionally in a powder form; providing a nitride material, optionally in a powder form, in an amount from 10 wt % to 50 wt %; providing a sintering aid; mixing the oxide material, the nitride material, and the sintering aid to form a precursor composition; wherein a weight ratio of the nitride material to the oxide material in the precursor composition ranges between 0.05:1 and 2.0:1; shaping the precursor composition; and heat treating the shaped composition to form the heat treated body wherein in the heat treated body, the nitride material is at least partially encapsulated in an oxide material lattice structure.

Embodiment 32: the embodiment of embodiment 31, wherein the heat treated body further comprises co-products, preferably oxided boron co-product and/or nitrided aluminum co-product.

Embodiment 33: the embodiment of any of embodiments 31 and 32, wherein the precursor composition comprises an initial amount of nitride material and the heat treated body comprises a heat treated amount of nitride material and wherein the heat treated amount is less than the initial amount.

Embodiment 34, the embodiment of any of embodiments 31-33, wherein the mixing of the oxide material, the nitride material, and the sintering aid is performed using a mill.

Embodiment 35, the embodiment of any of embodiments 31-34, further comprising adding a binder to the precursor composition.

Embodiment 36: the embodiment of any of embodiments 31-35, further comprising mixing the precursor composition with a binder, and spray drying the precursor composition mixed with the binder into particles or agglomerates.

Embodiment 37: the embodiment of any of embodiments 31-36, wherein the particles or agglomerates have an average diameter ranging from 40 microns to 120 microns.

Embodiment 38: the embodiment of any of embodiments 31-37, wherein heat treating the shaped composition comprises cold isostatic pressing the shaped composition to form the heat treated body.

Embodiment 39: the embodiment of any of embodiments 31-38 wherein heat treating the shaped composition comprises hot isostatic pressing the shaped composition to form the heat treated body.

Embodiment 40: the embodiment of any of embodiments 31-39, wherein the shape composition is baked at a temperature at about 400° C. for about 60 minutes.

Embodiment 41: the embodiment of any of embodiments 31-40, wherein the heat treating is conducted in air.

Embodiment 42: the embodiment of any of embodiments 31-41, wherein the heat treating is conducted in nitrogen.

Embodiment 43: the embodiment of any of embodiments 31-42, wherein the components of the heat treated body are dispersed throughout in a substantially uniform or homogenous manner.

Embodiment 44: the embodiment of any of embodiments 31-43, wherein the sintering aid comprises rare earth metal, fumed silica, magnesium oxide, petalite, tetraethyl orthosilicate, or magnesium trisilicate, or combinations thereof.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

We claim:

1. A crucible having a heat treated body, the heat treated body comprising a composition consisting of:
    greater than 50 wt % aluminum oxide, beryllium oxide, yttrium oxide, or combinations thereof;
    from 5 wt % to less than 50 wt % boron nitride;
    less than 5 wt % co-products of the oxide and the nitride; and
    optionally a sintering aid;
    wherein a weight ratio of the nitride to the oxide ranges from 0.02:1 to less than 1.0:1, and wherein the boron nitride is at least partially encapsulated in an oxide lattice structure.

2. The crucible of claim 1, wherein a weight ratio of the boron nitride to sintering aid ranges from 2:1 to 100:1.

3. The crucible of claim 1, wherein the sintering aid comprises rare earth metal, fumed silica, magnesium oxide, petalite, tetraethyl orthosilicate, or magnesium trisilicate, or combinations thereof.

4. The crucible of claim 1, wherein at least 10% of the boron nitride is at least partially encapsulated in the oxide lattice structure.

5. The crucible of claim 1, wherein in the heat treated body, boron nitride is at least partially encapsulated such that boron nitride comprises less than 50% of a surface area of an exterior surface of the heat treated body.

6. The crucible of claim 1, wherein the encapsulation of the boron nitride is achieved by heat treating a precursor composition to form the heat treated body comprising a heat treated composition, and wherein the precursor composition comprises an oxide material, a nitride material, and a sintering aid.

7. The crucible of claim 1, wherein the co-products of the oxide and the nitride comprise oxided boron, nitrided aluminum, nitrided beryllium, nitrided yttrium, or combinations thereof.

8. The crucible of claim 1, wherein, when contacted with molten metal at temperatures below 1700° C., less than 5% of the contacted surface area is adhered to by the molten metal.

9. The crucible of claim 1, wherein, when contacted with molten metal at temperatures greater than or about 1550° C., the wetting angle of the molten metal is greater than 90 degrees.

10. The crucible of claim 1, wherein the heat treated body has an average wall thickness ranging from 2 mm to 25 mm.

11. The crucible of claim 1, wherein, after exposure to at least 10 cycles of 68% nitric acid cleaning, the heat treated body retains at least 99% of the initial hardness.

12. The crucible of claim 1, wherein the composition comprises less than 1 wt % carbon.

13. A process for producing a crucible having a heat treated body, the method comprising:
    providing an oxide material, optionally in a powder form;
    providing a nitride material, optionally in a powder form, in an amount from 10 wt % to 50 wt % boron nitride;
    providing a sintering aid;
    mixing the oxide material, the nitride material, and the sintering aid to form a precursor composition;
    wherein a weight ratio of the nitride material to the oxide material in the precursor composition ranges between 0.05:1 and 2.0:1 less than 1.0:1;
    shaping the precursor composition; and
    heat treating the shaped composition to form the heat treated body having a composition consisting of:
        from 50 wt % to 90 wt % an oxide selected from aluminum oxide, beryllium oxide, yttrium oxide, or combinations thereof;
        from 10 wt % to 50 wt % boron nitride;
        less than 5 wt % co-products of the oxide and the boron nitride; and
        less than 5 wt % of the sintering aid;
    wherein in the heat treated body, the boron nitride material is at least partially encapsulated in an oxide material lattice structure.

14. The process of claim 13, wherein the precursor composition comprises an initial amount of boron nitride material and the heat treated body comprises a heat treated amount of boron nitride material and wherein the heat treated amount is less than the initial amount.

15. The process of claim 13, further comprising mixing the precursor composition with a binder, and spray drying the precursor composition mixed with the binder into agglomerates having an average diameter ranging from 40 microns to 120 microns.

16. A crucible having a heat treated body, the heat treated body having a composition consisting of:
    from 50 wt % to 90 wt % an oxide selected from aluminum oxide, beryllium oxide, yttrium oxide, and combinations thereof;
    from 10 wt % to 50 wt % boron nitride;
    less than 5 wt % co-products of the oxide and the boron nitride; and less than 5 wt % of a sintering aid.

17. The crucible of claim 16, wherein the sintering aid is selected from a rare earth metal, a fumed silica, magnesium oxide, petalite, tetraethyl orthosilicate, magnesium trisilicate, and combinations thereof.

18. The crucible of claim 16, wherein the oxide is present in an amount from 65 wt % to 90 wt % and the boron nitride is present in an amount from 10 wt % to 35 wt %.

19. The crucible of claim 16, wherein the oxide is present in an amount from 75 wt % to 85 wt % and the boron nitride is present in an amount from 15 wt % to 20 wt %.

20. The crucible of claim 16, wherein the oxide contains less than 10 wt % yttrium oxide.

* * * * *